Dec. 22, 1931.  A. C. STOCKER  1,838,010
ALTERNATING CURRENT MACHINE
Filed Sept. 19, 1930

Inventor:
Arthur C. Stocker,
by Charles E. Tullar
His Attorney.

Patented Dec. 22, 1931

1,838,010

UNITED STATES PATENT OFFICE

ARTHUR C. STOCKER, OF AUDUBON, NEW JERSEY, ASSIGNOR TO GENERAL ELECTRIC COMPANY, A CORPORATION OF NEW YORK

ALTERNATING CURRENT MACHINE

Application filed September 19, 1930. Serial No. 483,029.

My invention relates to the construction of alternating current machines and particularly to such machines which are adapted to form parts of a television system. In such a system employing rotating scanning disks driven by synchronous machines at the transmitting and receiving stations, the two disks must have the same angular relation when rotating to produce proper "framing" of the received picture and they must be "locked" together when having that relation to prevent drifting of the picture. Heretofore two separate alternators have been used at the transmitting stations, one to generate low frequency "framing" impulses and the other to generate high frequency "locking" impulses, corresponding machines being employed as synchronous motors at the receiving station. It is the object of my invention to provide an improved alternating current machine in which both the low frequency framing impulses and the high frequency locking impulses are produced in the case of a generator, the one frequency being modulated by the other, or the two frequencies are combined to effect the desired movement of the rotor in the case of a motor.

My invention will be better understood from the following description taken in connection with the accompanying drawings, and its scope will be pointed out in the appended claims.

Figure 1:
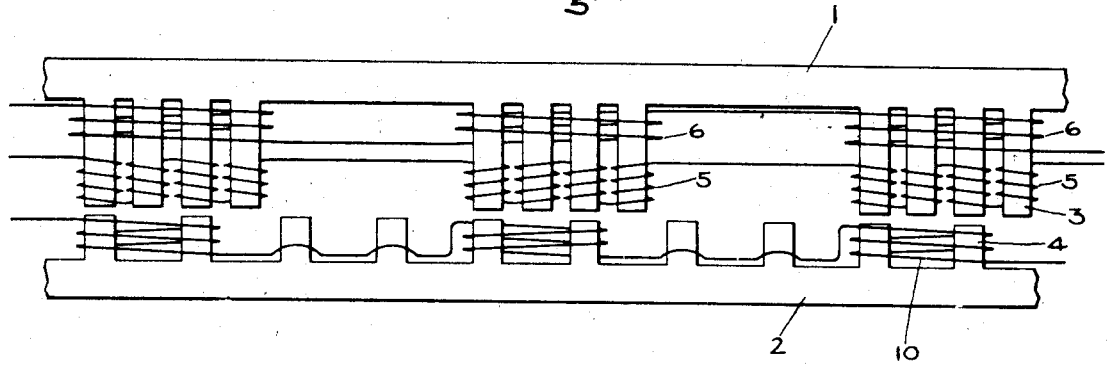
Figure 2:
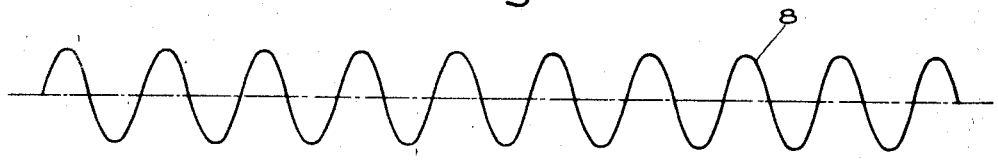
Figure 3:
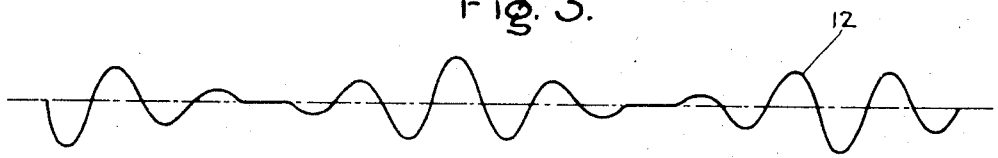
Figure 4:
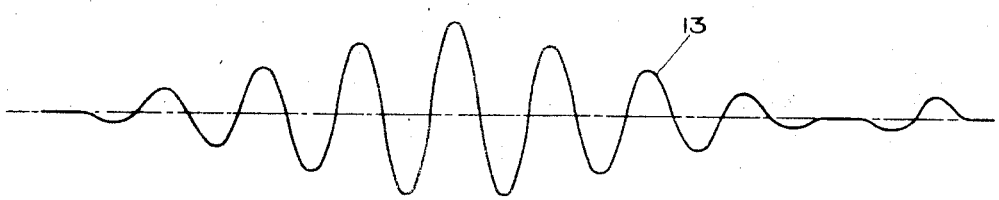

Referring to the drawings, Fig. 1 shows a development of the polar portions of a machine embodying my invention; and Figs. 2, 3 and 4 represent various wave forms obtained therewith. The machine partly illustrated in Fig. 1 is shown comprising a stator 1 and a rotor 2. Both rotor and stator are provided with polar projections or teeth having substantially the same width, those on the stator being represented at 3 and those on the rotor being represented at 4. The polar projections on the stator are shown arranged in groups of four, the separate projections having a generating winding 5 thereon which is wound in opposite directions on adjacent projections of a group. Around each group of projections forming a pole is a field winding 6 which winding extends in opposite directions around adjacent groups so as to form alternate field poles and is connected to a suitable source (not shown) of direct current.

When the rotor of a machine so constructed is rotated, an alternating current is produced, such for example as that shown at 8 in Fig. 2 which is the high frequency locking current referred to above. To produce a low frequency framing current by which the high frequency current is modulated, I provide the rotor also with a field winding. This winding as shown at 10 includes groups of rotor projections 4; in the present case two projections, thus forming alternate poles on the rotor which have the same pitch as the field poles of the stator. The rotor field winding 10 may connect through suitable slip rings, not shown, to a suitable source (not shown) of D. C. supply which may be the same or a different source from that by which the stator field winding is supplied. If now the rotor is rotated with its field winding energized and the field winding of the stator deenergized, an alternating current will be induced in the stator generating winding of the form represented by 12 in Fig. 3. With both the stator and rotor field windings energized the resulting alternating current induced in the generating winding will be the algebraic sum of the currents shown in Figs. 2 and 3 and as represented by 13 in Fig. 4. Thus it will be seen that the single generating winding 5 has induced in it a high frequency corresponding to the number of polar projections on the rotor and as shown in Fig. 2, which current will be modulated by a low frequency current whose frequency corresponds with the number of field poles on the stator and rotor determined by the field windings thereon.

While I have referred to the machine as a generator, it will be understood that the same construction may be employed in a synchronous motor which when supplied by current having a wave form such as shown in Fig. 4, will, when brought up to speed, lock into position in accordance with the high frequency current and only into as many angular positions as there are pairs of poles on the rotor. It will also be understood that the machine may be constructed with any even number of field poles and that the number of polar projections comprising each rotor and stator pole may be varied from the number shown in Fig. 1. Furthermore, rotor and stator parts may be reversed, either part being maintained stationary and the other rotated, or if desired, both parts may be rotatable provided relative movement takes place therebetween.

I have chosen the particular embodiment described above as illustrative of my invention and it will be apparent that various modifications may be made without departing from the spirit and scope of my invention, which modifications I aim to cover by the appended claims.

What I claim as new and desire to secure by Letters Patent of the United States, is:

1. An alternating current generator adapted to produce a current of one frequency modulated by another frequency comprising relatively rotatable members each having polar projections, a generating winding on the projections of one of said members, and direct current field windings on each of said members.

2. An alternating current generator comprising relatively rotatable members each having direct current windings for producing alternate poles thereon and having polar projections, the poles of the respective members comprising different numbers of projections and a generating winding on the projections of one of said members, whereby a plurality of alternating electromotive forces of different frequencies are induced in said winding.

3. An alternating current machine comprising rotor and stator members each having polar projections thereon, a generating winding on the projections of one of said members, a direct current field winding surrounding groups of the projections of said one member and a direct current field winding surrounding groups of the projections of said other member.

4. An alternating current machine comprising rotor and stator members having polar projections thereon, a direct current field winding on each of said members arranged to produce an equal number of alternate poles thereon, and a generating winding surrounding separate projections of one of said members.

5. An alternating current machine comprising rotor and stator members each having polar projections and having fixed poles of alternate polarity, each pole of one of said members comprising a plurality of projections having oppositely wound windings thereon.

6. An alternating current generator comprising rotor and stator members each having polar projections thereon, direct current field windings surrounding groups of projections of each of said members, and generating windings on the projections of one of said members.

7. An alternating current generator for producing a current of one frequency modulated by that of another frequency comprising rotor and stator members each having polar projections, the polar projections of one member being spaced regularly, a direct current field winding on said one member producing alternate poles in certain projections thereof separated by other projections, a direct current field winding on said other member producing alternate poles comprising spaced groups of projections thereon and a generating winding comprising coils individual to projections of said other member.

8. An alternating current generator for producing a current of one frequency modulated by that of another frequency comprising rotor and stator members each having polar projections, the polar projections of one member being spaced regularly, a direct current field winding on said one member comprising a plurality of spaced coils each enclosing a plurality of the projections thereon, a direct current field winding on the other of said members comprising a plurality of coils each enclosing a plurality of the projections thereon and having the same peripheral spacing as the coils on said one member and a generating winding on said other member including coils individual to the projections enclosed by the field coils thereof.

9. An alternating current generator for producing a current of one frequency modulated by that of another frequency comprising a rotor having polar projections regularly spaced about the periphery thereof, a direct current field winding on the rotor comprising regularly spaced coils each enclosing a plurality of said projections, a cooperating stator having polar projections arranged in spaced groups, a direct current field winding on the stator comprising coils enclosing the projections of the respective groups, and a generating winding on the stator comprising individual coils on the projections thereof.

In witness whereof I have hereunto set my hand this 15th day of September, 1930.

ARTHUR C. STOCKER.